United States Patent
Feldges et al.

(10) Patent No.: US 8,359,914 B2
(45) Date of Patent: Jan. 29, 2013

(54) PROCEDURE FOR CHECKING THE FUNCTIONALITY OF A PUMP

(75) Inventors: Andreas Feldges, Ludwigsburg (DE); Andreas Wagner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 621 days.

(21) Appl. No.: 12/609,248

(22) Filed: Oct. 30, 2009

(65) Prior Publication Data
US 2010/0107748 A1    May 6, 2010

(30) Foreign Application Priority Data
Nov. 3, 2008    (DE) .......................... 10 2008 043 405

(51) Int. Cl.
*G01M 15/04*    (2006.01)
(52) U.S. Cl. .................................... 73/114.69
(58) Field of Classification Search ............... 73/114.69, 73/114.75
See application file for complete search history.

(56) References Cited

U.S. PATENT DOCUMENTS

| | | | |
|---|---|---|---|
| 6,063,350 A * | 5/2000 | Tarabulski et al. .......... | 423/239.1 |
| 7,776,265 B2 * | 8/2010 | Berryhill et al. ............. | 422/68.1 |
| 7,805,930 B2 * | 10/2010 | Satou et al. ..................... | 60/286 |
| 8,033,096 B2 * | 10/2011 | Nishina et al. .................. | 60/277 |
| 8,132,449 B2 * | 3/2012 | Hartimath et al. ......... | 73/114.69 |
| 8,161,808 B2 * | 4/2012 | Crawford et al. .......... | 73/114.75 |
| 2007/0180816 A1 * | 8/2007 | Masuda et al. ................. | 60/274 |
| 2010/0172763 A1 * | 7/2010 | Habumuremyi ................ | 417/32 |
| 2011/0083424 A1 * | 4/2011 | Wang et al. ..................... | 60/277 |

* cited by examiner

*Primary Examiner* — Freddie Kirkland, III
(74) *Attorney, Agent, or Firm* — Merchant & Gould, P.C.

(57) ABSTRACT

A procedure for checking the functionality of a reducing agent pump (172) of a NOx-reduction system of a combustion engine (110) is thereby characterized, in that it is checked, whether the pump (172) reaches a default engine speed value in a defined time interval within defined limits.

10 Claims, 2 Drawing Sheets

1st defrost cycle of the tank   2nd defrost cycle of the tank

PROCEDURE FOR CHECKING THE FUNCTIONALITY OF A PUMP

This application claims benefit of Serial No. 10 2008 043 405.1, filed 3 Nov. 2008 in Germany and which application is incorporated herein by reference. To the extent appropriate, a claim of priority is made to the above disclosed application.

TECHNICAL FIELD

The invention relates to a procedure for checking the functionality of a reducing agent pump of a NOx-reduction system of a combustion engine.

Subject matter of the invention is also a computer program and a computer program product, which qualify for implementing the procedure.

BACKGROUND

The reduction of nitric oxide emissions of a combustion engine that works with oxygen surplus, in particular a diesel combustion engine can take place with the aid of the so-called selective catalytic reduction technology (SCR). A reduction of nitric oxides into nitrogen and hydrogen is thereby carried out, whereby gaseous ammoniac or ammoniac in aqueous solution or urea in aqueous solution are used as reducing agent. The urea serves thereby as ammoniac carrier. With the aid of the metering system in front of a hydrolysis catalytic converter the reducing agent is injected into the exhaust gas pipe of the combustion engine. It is converted in the hydrolysis catalytic converter with the aid of the hydrolysis into ammoniac, which then further reduces the nitric oxides in the exhaust gas in the main SCR-catalytic converter, which is also called DENOX-catalytic converter. The main components of such a NOx-reduction system are a reducing agent tank, a pump, a pressure regulator, a pressure sensor and a metering valve. The pump advances the reducing agent that is stored in the reducing agent tank to the metering valve, with which the reducing agent is injected into the exhaust gas current upstream of the hydrolysis catalytic converter. The metering valve is thereby controlled by signals of a control unit, for example the control unit of the combustion engine, in order to supply a specific actually required amount of reducing agent. Substances that are present in aqueous solution and releasing ammoniac, such as urea, are preferably used, because they store reducing agent significantly easier and are easier to handle than for example gaseous ammoniac. Furthermore the ability to advance and meter this solution is technically significantly easier than for example the advancing and metering of gaseous substances. A disadvantage of the aqueous solution of for example urea is that the reducing agent solution has a freezing point of −11° C. Therefore devices have to be provided for heating the reducing agent in the reducing agent tank.

The reducing agent amount is advanced at such reduction systems by a pipe from the reducing agent tank to the metering valve. The pipe pressure is regulated to a constant value with the aid of a controlling of the pump. A significant requirement therefore is the proper functioning of the pump, which is necessary to be able to keep the default nominal pressure in the system stabile.

The invention is therefore based on the task to provide a procedure for checking the functionality of a pump engine of a reducing agent pump, which can be realized by simple means.

SUMMARY

This task is solved by a procedure for checking the functioning of a reducing agent pump of a NOx-reduction system of a combustion engine thereby, that it is checked whether the pump reaches a defined engine speed value in a default time interval within defined limits. If that is the case a functioning pump engine and therefore a functioning pump is assumed, if that is not the case a defect pump engine is assumed. The "boot up" of the pump to a defined engine speed value within a default time interval is also called warm-up cycle (WUC). The term "defined limits" or "defined engine speed value" means limits or values, which have previously been determined empirically and defined in so far. Those values are integrated in electronic units of the pump engine.

This warm up cycle is of particular importance because at very cold temperatures it can happen that the pump does not reach the nominal engine speed immediately. Therefore a checking of the functioning of the pump is required, which is advantageously connected with the warm up cycle. Or rephrasing, the checking of the functionality of the pump is simultaneously a warm up cycle, at which the pump is controlled with a constant defined signal (duty cycle), which is outside of the normal operating area and working area of the pump. A deviation from the default nominal engine speed is detected by the electronic, which serves for controlling the pump engine. In the case of a deviation of the engine speed from the nominal engine speed by a default value longer than a default time interval a defect of the pump can be assumed.

With the measures that are stated in the dependent claims configurations and improvements of the procedure that is stated in the independent claim are made possible.

Thus an advantageous embodiment provides to start the checking if the remaining defrosting time of the reducing agent solution in the reducing agent tank falls below a default threshold value.

The background for these steps of the procedure is that at cold temperatures the hydraulic system, in particular the reducing agent in the reducing agent tank has to be defrosted at first before an enabling for the metering operation can be issued by the control electronic. In order not to fall below the required time intervals for the metering standby that are set by law, it is not sufficient to warm up the pump and the pump engine after the metering enabling. Therefore the pump warm up has to be already started when the remaining defrosting time of the reducing agent solution in the reducing agent tank falls below a default threshold value. Therefore the still remaining defrosting time is determined and the checking is started before the defrosting time elapses. According to an advantageous embodiment it is thereby provided that the threshold value is determined by a maximum checking time of the checking of the functionality of the pump engine.

Advantageously the procedure for checking the functionality has only to be started once more, which means the warm up cycle has to be started one more time, if the NOx-reduction system has not yet shifted into metering mode after a default time, thus if no metering enabling has taken place yet. By this means it can advantageously ensured that the idle pump does not cool off so much that an undesired engine speed deviation is detected when starting again. The pump is only controlled during metering operation.

BRIEF DESCRIPTION OF THE DRAWINGS

Embodiments of the invention are illustrated in the drawings and further explained in the subsequent description.

It is shown in:

FIG. 1 schematically a NOx-reducing agent system of a combustion engine and in

DETAILED DESCRIPTION

Figure 1:
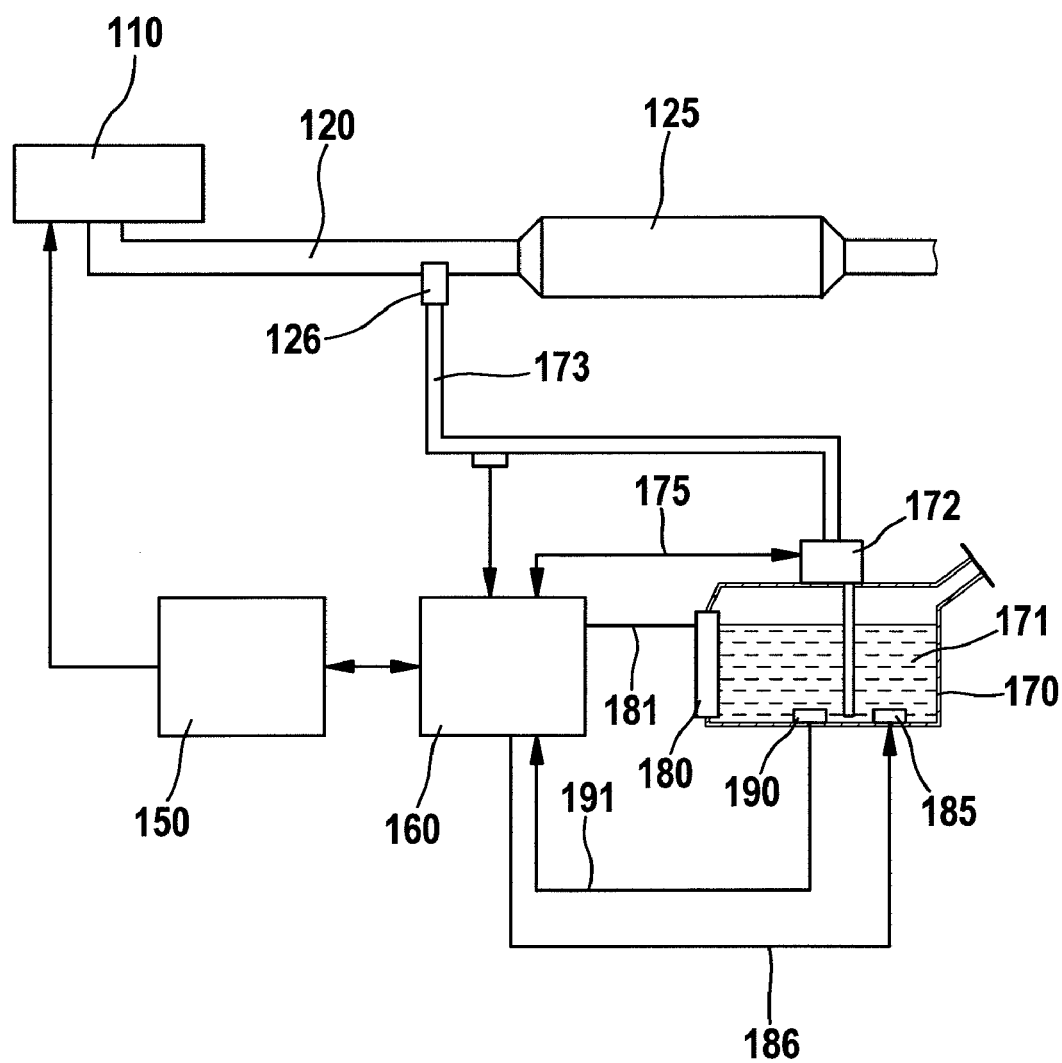

Figure schematically shows a NOx-reduction system of a motor vehicle.

A reducing catalytic converter 125 is arranged in an exhaust gas pipe 120 of a combustion engine 110 that works with oxygen surplus, in particular a diesel combustion engine. An engine control unit 150 is provided, which for example controls (not further shown) injection valves and such alike of the combustion engine 110. The engine control unit 150 is supplied with signals that characterize the operation of the combustion engine 110. The engine control unit 150 communicates with a metering control unit 160 of the NOx-reduction system. It contains a tank 170, which is filled with a urea-water solution 171. The filling level is for example detected with the aid of a filling level sensor 180, whose output signal is supplied to the metering control unit 160 over a control line 181. In the reducing agent tank 170 there is furthermore a heating 185, which can be controlled over a signal line 186 by the metering control unit 160. In the tank 170 there is furthermore a temperature sensor 190, whose output signal is also supplied over a control line 191 to the metering control unit 160. The reducing agent solution 171, for example a urea water solution, is advanced over a pump 172 into a pipe 173, which leads to the metering valve 126, which is arranged upstream of the SCR-catalytic converter 125. With the aid of this metering valve 126 the reducing agent is injected into the exhaust gas pipe 120 of the combustion engine 110 in certain operating areas of the combustion engine.

It has to be mentioned that the catalytic converter 125 comprises a SCR-catalytic converter, which is also called DENOX-catalytic converter, and a hydrolysis catalytic converter. The former serves the purpose to convert the reducing agent with the aid of a hydrolysis into ammoniac. This ammoniac is then used in the actual SCR-catalytic converter to reduce nitric oxides in the exhaust gas. The pump 172 can be controlled by a signal line 175 by the metering control unit 260. Thereby intelligent electronics are used for controlling the pump engine of the pump 172, which detects a deviation from a default nominal engine speed. If such a deviation from default limits, at a pump type for example +/−300 rpm for more than 5 seconds, is detected, it is acknowledged by the control line 175. So now the pump engine does not reach immediately the nominal engine speed at very low temperatures. For this reason the invention provides a procedure for checking the functioning of the pump engine, which is simultaneously a warm up cycle (WUC). The pump 172 is therefore controlled by the metering control unit 160 until a defined and empirically determined nominal engine speed is reached. This warm up cycle is activated by controlling the pump 172 with a constant defined signal (duty cycle). This duty cycle lies outside the normal working range of the pump 172. Due to this warm up cycle it is prevented that an engine speed deviation is detected if the pump 172 has not reached the nominal engine speed at very low temperatures. Thus wrong error messages and inputs in an error storage are avoided.

In particular at temperatures below the freezing point, which is for example −11° C. for urea-water solution, it is necessary to defrost the reducing agent in the hydraulic system at first before an enabling for the metering operation takes place. Now strict statutory provision regulate that the metering operation has to be achieved within default time intervals after the start of the combustion engine. In order to achieve those starting times for the metering operation the pump 172 cannot be warmed up after the metering enabling and checked upon its functionality. The checking of the functionality and the warming up of the pump 172 that comes with it has rather be started before the heating process is over. Therefore the remaining defrosting time is determined and before this defrosting time elapses the procedure for checking the functionality of the metering pump and therefore warming up of the pump 172 has to be started. The time is thereby chosen in such a way that after the tank heating time has elapsed and after the metering enabling the line can be immediately filed.

If there is no metering enabling after the end of the tank heating process the checking of the functionality of the pump 172 and therefore the warming up of the pump 172 has to be started again after a default time has elapsed. Thereby it is ensured that an idle pump 172 does not cool off so much that an undesired engine speed deviation is detected during the new start. It has to be noticed thereby that the pump 172 is only permanently controlled during the metering operation.

Figure 2:
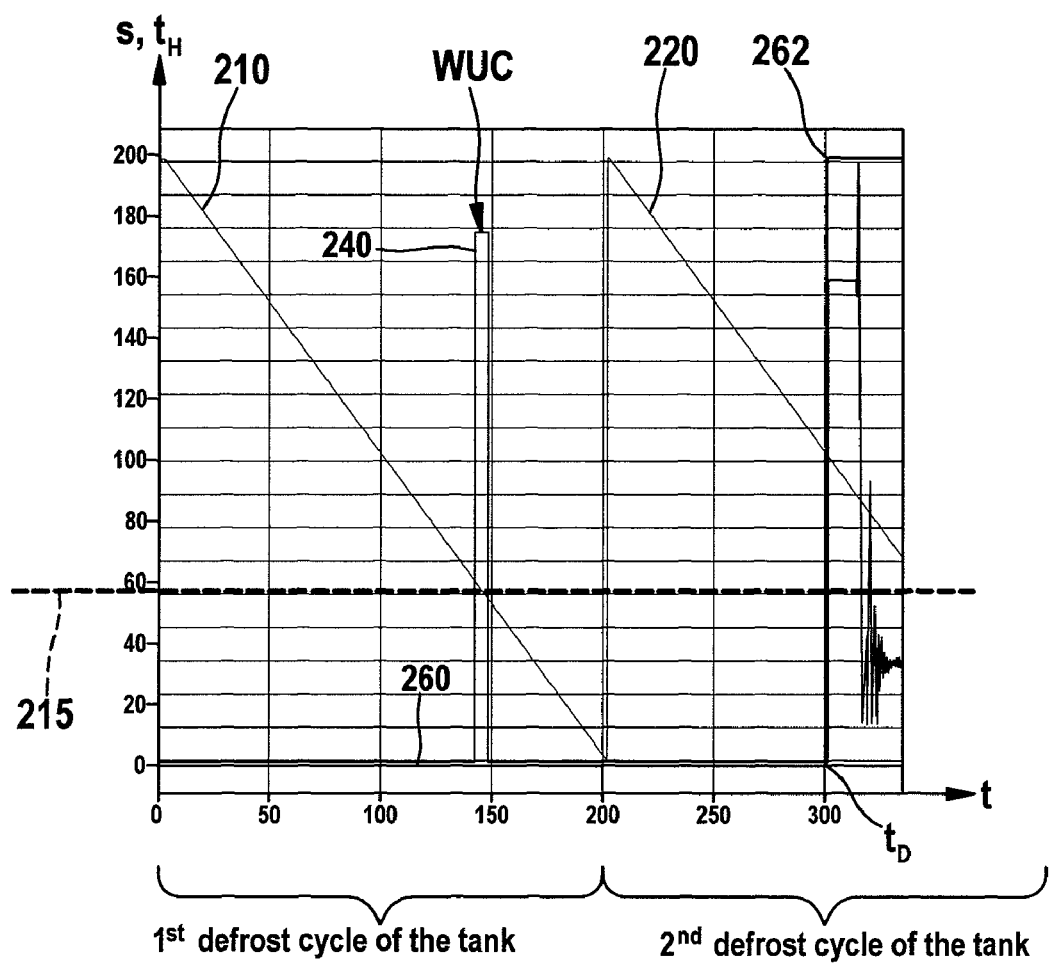
FIG. 2 is the start up process of a reducing agent solution tank for explaining the procedure according to the invention.

The procedure is subsequently further explained in connection with FIG. 2. FIG. 2 schematically shows the remaining heating time $t_H$ as well as signals S for starting a warm up cycle as well as for the metering enabling over the time t.

If the temperature of the reducing agent, measured by the temperature sensor 190 lies below the freezing point of the reducing agent, a defrosting of the reducing agent takes place at first: "$1^{st}$ defrost cycle of the tank". Such a defrosting process can be repeated as it is shown by curve 220: "$2^{nd}$ defrost cycle of the tank". This is schematically shown by curve 210, which represents the remaining heating time $t_H$ of the tank and decreases over the time and therefore provides a negative slope. The pump engine of the pump 172 requires for example maximally one minute in order to reach the nominal engine speed within a warm up cycle. Therefore the warm up cycle or the procedure for checking the functionality of the pump 172 has to be started when the remaining tank defrosting time of the heating cycle (heating time $t_H$) is approximately one minute. If the heating time 210 falls below this value 215 a signal 240 is emitted, in FIG. 2 shown as rectangular pulse, with which the procedure for checking the functionality of the pump 172 and therefore the warming up cycle (WUC) is started. The pump engine is thereby started and maintained until a defined nominal engine speed is reached. Therefore it is controlled with a defined signal (duty cycle). This duty cycle lies outside the normal working range of the pump 172. It is checked whether the pump 172 reaches a defined engine speed value within a defined default time interval within default limits. If that is the case a functioning pump 172 is assumed.

If the pump 172 does not reach the engine speed within the defined time interval no so-called acknowledging signal that confirms this result is send out, but rather an error signal or time-out signal is set.

The checking of the pump 172 and the warming up cycle that come with it is only carried out again if a default time has elapsed without a signal that characterizes the metering standby being emitted by the metering control unit 160, which means without starting a new metering process, no matter if a second defrosting process of the reducing agent is started ("$2^{nd}$ defrost cycle of the tank"). The metering standby is shown in FIG. 2 by curve 260. Until the time $t_D$ no metering takes place. At the point of time $t_D$ a signal is emitted by the metering control unit 260, with which the metering enabling is issued. The metering enabling can for example be detected by a status change of a SCR-procedure-control. This SCR-procedure-control, which means the control of the operating enabling of the metering system takes place in the metering control unit 260. That signal is shown by a signal 262 in FIG. 2. A warming up cycle is therefore always started only if a default time has elapsed without a metering enabling having taken place.

The invention claimed is:

1. A procedure for checking the functioning of a reducing agent pump of a NOx-reduction system of a combustion engine wherein it is checked whether the pump reaches a default engine speed value in a default time interval within defined limits.

2. The procedure according to claim 1, wherein the checking is started if a remaining defrost time of a frozen reducing agent solution in a reducing agent tank falls below a default threshold value.

3. The procedure according to claim 2, wherein the default threshold value is determined by a default maximum checking time of the checking of the functioning of the pump.

4. The procedure according to claim 1, wherein a warm up cycle of the pump by controlling the pump with a default engine speed value only takes place if no signal is released within a default time interval that characterizes a metering standby of the NOx-reduction system.

5. The procedure according to claim 1, wherein the pump is controlled by a metering control unit until a defined nominal engine speed is reached.

6. The procedure according to claim 5, wherein the controlling of the pump with a signal that comprises a defined nominal engine speed a warm up cycle of the pump is realized.

7. The procedure according to claim 6, wherein the pump is controlled by a constant defined duty cycle signal.

8. The procedure according to claim 7, wherein the duty cycle signal is located outside a normal working area of the pump.

9. A computer-implemented method for implementing all steps of the procedure according to claim 1, when carried out on a control unit of a combustion engine.

10. A computer program product with a program code stored on a non-transitory machine-readable medium for implementing the procedure according to claim 1, when the program is carried out on a computer or a control unit of the combustion engine.

* * * * *